July 7, 1925.  
C. W. SCHAEFER  
1,544,602
VEHICLE SPRING COVER
Filed Nov. 22, 1922
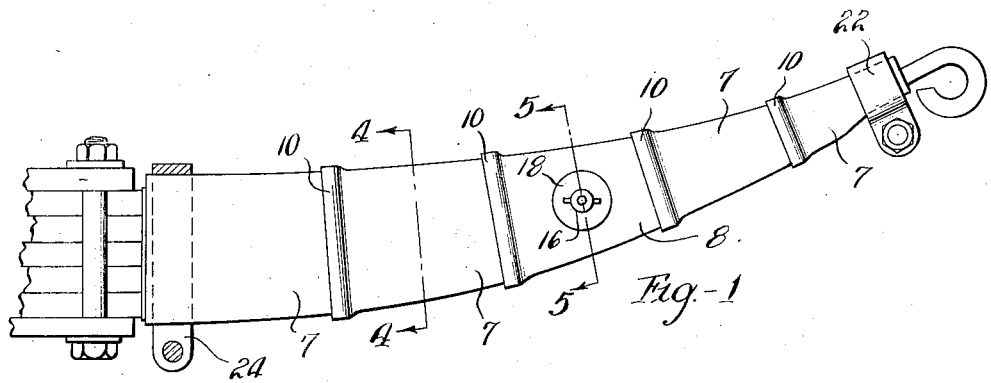
Fig.-1
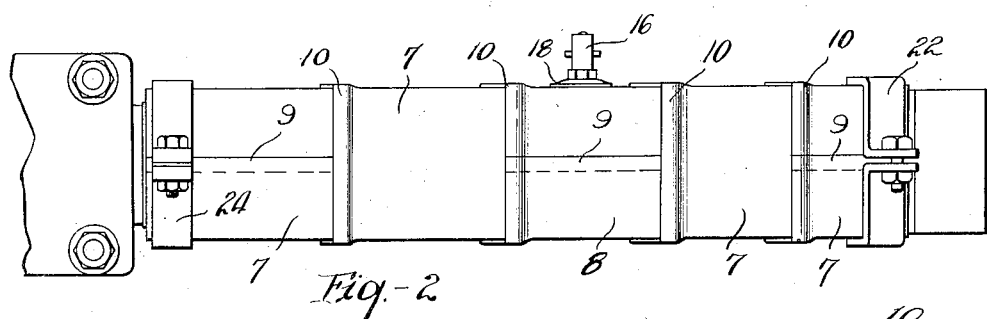
Fig.-2
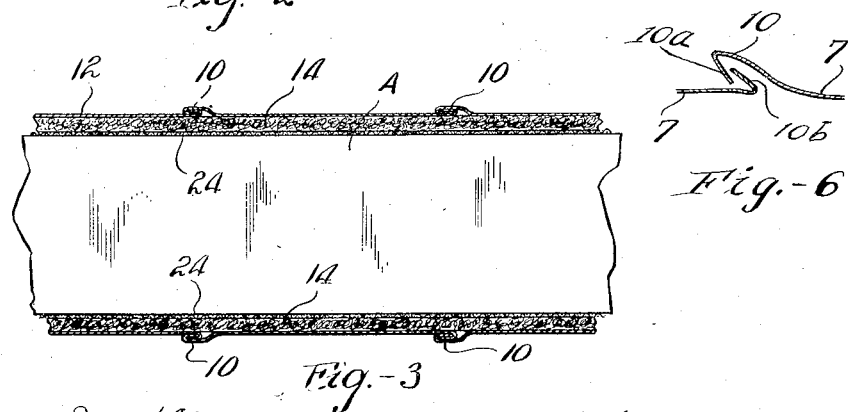
Fig.-3
Fig.-6
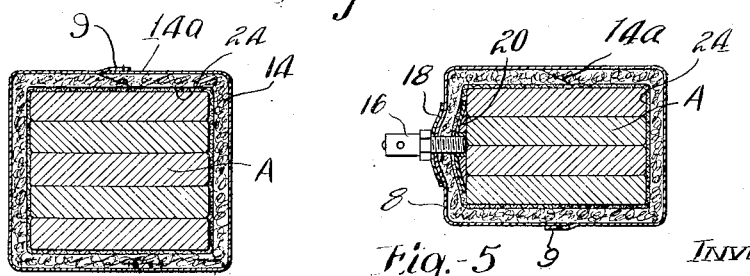
Fig.-4
Fig.-5
INVENTOR  
Carl W Schaefer  
BY Bates & Mocklin  
ATTYS Patented July 7, 1925.

1,544,602

UNITED STATES PATENT OFFICE.

CARL W. SCHAEFER, OF LAKEWOOD, OHIO, ASSIGNOR TO ALBERT E. HODGINS, OF CLEVELAND, OHIO.

VEHICLE SPRING COVER.

Application filed November 22, 1922. Serial No. 602,515.

*To all whom it may concern:*

Be it known that I, CARL W. SCHAEFER, a citizen of the United States, residing at Lakewood, in the county of Cuyahoga and State of Ohio, have invented a certain new and useful Improvement in Vehicle Spring Covers, of which the following is a full, clear, and exact description, reference being had to the accompanying drawings.

This invention relates to metallic vehicle spring covers and has for its essential object the provision of such covers which may be readily and efficiently positioned upon the spring of a vehicle even while the spring is in position.

Another object of the present invention is the provision, in a cover having an outer metallic casing and an inner flexible impervious fabric lining adapted for the reception of lubricant under pressure, of cushioning means disposed between the metallic casing and the fabric lining to prevent wear upon the lining.

Other objects will become apparent from the following description taken in connection with the accompanying drawings. The essential features are summarized in the claims.

In the drawings, Fig. 1 is a side elevation of the usual vehicle leaf spring equipped with my casing; Fig. 2 is a plan view of the same; Fig. 3 is a cross sectional plan view taken longitudinally of the spring; Fig. 4 is a transverse section taken substantially along the line 4—4 in Fig. 1; Fig. 5 is a similar cross section taken substantially along the line 5—5 in Fig. 1; Fig. 6 is an enlarged cross section of the seam.

Designating the various parts of the device by the use of reference characters in Fig. 1, I show a spring housing comprising an outer metallic casing formed of a plurality of inter-engaging sections 7 having adjacent flanged edges thereof overlapping and inter-engaged, as shown at 10 in Figs. 1, 2 and 3. The housing or casing is provided with an inner lubricant impervious fabric lining 24 extending longitudinally of the spring laminations L and closely fitting around the four sides thereof. The sections 7 are formed with a sufficient width and depth to provide an intermediate space between the fabric lining and the inner surfaces of the respective sections which I prefer to fill with cushioning material, such as felt or padding 14, the felt being placed about the inner lining in the form of a sheet having the edges thereof interfitting, as indicated at 14$^a$, Figs. 4 and 5.

To afford a relative movement between the respective sections while at the same time maintaining them in position upon the spring, I flange the edges thereof in the manner illustrated in Fig. 6, whereby the respective sections may be assembled upon the spring with the longitudinal edges thereof in overlapping relation, as shown at 9, Fig. 4. The flanged edges 10 extend around four sides of the spring and when assembling the sections upon the spring the inwardly extending flange portions 10$^a$ slip over outwardly extending flanged portions 10$^b$ formed on an adjacent section, whereby compressing of the flange 10 will cause the flange portions 10$^a$ and 10$^b$ to be brought into the closed relation illustrated in Fig. 3.

These coacting flange portions are so proportioned that their engagement in the manner shown will permit a sliding movement therebetween within predetermined limits, whence the metallic casing, when assembled upon the spring laminations, may readily conform to any deflecting condition of the spring leaves without resulting in damage to the sections comprising the casing.

By positioning the sections 7 upon the spring with the longitudinal lap joint 9 alternately disposed upon the top and bottom of the spring, I find that no additional clamping means is necessary to maintain the sections in proper position upon the spring. I provide the usual clamping members 24 and 22 acting upon the inner and outer end sections of the spring casing which may grip the end sections in the usual manner thus preventing the escape of lubricant from the interior of the fabric lining when forced therein under pressure.

To establish communication between the interior of the fabric lining and a lubricant compressing means, such as a grease gun, I provide a grease gun coupling 16 which engages a flanged washer member 20 disposed interiorly of the fabric lining, the coupling member 16 bearing against an exteriorly disposed washer 18; the washer members 18 and 20 acting as a clamp when the coupling member 16 is brought into threaded engagement with the washer member 20. The felt cushion 14 is thus firmly clamped to the fabric lining and to the side walls of the metallic section 8. Escape of lubricant through the apertures formed in the metallic casing, the felt and the lining for the reception of the coupling member 16 is thus prevented in a very effective manner.

It will be noted that in the embodiment of my invention I herein disclose the impervious lining which may be expanded a slight amount when filled longitudinally of the spring by lubricant forced through the coupling member 16 under pressure; this slight expansion being permitted by the compressing of the cushioning means, which as before stated, is preferably felt. Furthermore, the respective sections comprising the metallic casing while being formed in the simplest manner, nevertheless, when placed in assembled relation upon the spring, are extremely effective in maintaining the felt cushion and fabric lining in cooperative relation even when lubricant is forced within the lining under considerable pressure. The cushion of felt, furthermore, prevents any undue pressure of the lining upon the springs by the metallic sections comprising the outside of the spring cover.

Having thus described my invention, I claim:

1. A spring casing adaptable for the reception of lubricant under pressure, comprising a plurality of sections made of thin sheet metal completely surrounding four sides of the spring, each section having the ends thereof flanged to engage a flange of an adjacent section, whereby the relative movement of the respective sections is determined by the engagement of the respective flanges, coupling means carried by one of the sections for establishing communication between a grease gun and the interior of the casing, and clamping means compressing the end sections of the casing into engagement with the spring.

2. A metallic spring casing adaptable for the reception of lubricant under pressure, comprising a plurality of relatively movable sections, each section completely surrounding the spring and having flanged edges also completely extending around the spring and engaging similar flanges formed on adjacent sections, whereby relative movement of the sections is limited by the engagement of the flanges, coupling means carried by one of the sections affording a connection for a grease gun whereby lubricant may be forced throughout the casing under pressure, each section of the casing having overlapping edges extending longitudinally of the spring, the sections being assembled on the spring with the overlapping edges of the sections alternately disposed upon the top and bottom of the spring.

3. In a spring casing adaptable for the reception of lubricant under pressure, the combination of a plurality of relatively movable sections surrounding the spring, each section provided with means engaging an adjacent section to limit the relative movement therebetween, a lubricant impervious lining completely surrounding the spring disposed within said sections and in intimate contact with the spring leaves, cushioning means disposed between said lining and said sections, whereby said impervious lining may be expanded under the influence of the lubricant forced therein, and coupling means for a grease gun carried by one of the sections maintaining the impervious lining, the cushioning means and said section in sealed relation.

4. In a spring casing adaptable for the reception of lubricant under pressure, the combination of an inner lubricant impervious lining completely surrounding the spring laminations, an outer metallic casing surrounding the lining and comprising a plurality of relatively movable sections extending around the spring leaves with an intervening space between the walls of the sections and said lining, cushioning means disposed in said intermediate space extending the length of the spring on four sides thereof, grease gun coupling means carried by one of the sections and extending inwardly to the interior of said lining, and securing means therefor maintaining said outer casing, said cushioning means and said lining in clamped relation, whereby the escape of lubricant being forced to the interior of the lining by a grease gun through said coupling means, is prevented.

5. In a spring casing of the character described, the combination of a plurality of relatively movable sections completely surrounding four sides of the spring, an inner lining comprising a lubricant impervious fabric also extending along four sides of the spring, there being an intermediate space between the casing and the lining, cushioning means disposed in said space, grease gun coupling means carried by one of the sections, whereby lubricant may be forced within said lining under pressure, and means securing the end sections of one end of the casing in clamped relation to the spring laminations, whereby lubricant is prevented from escaping therethrough.

6. A spring casing adaptable for the reception of lubricant under pressure, comprising a plurality of relatively movable sections made of thin sheet metal extending around the spring embracing four sides of the spring, each section having the ends thereof flanged to engage a flange of an adjacent section, whereby the relative movement of the respective sections is determined by the engagement of the respective flanges, coupling means carried by one of the sections for establishing communication between a grease gun and the interior of the casing, and resilient means disposed between said lining and said metallic sections for yieldingly supporting said lining in contact with the spring.

7. In a spring casing adaptable for the reception of lubricant under pressure, the combination of a plurality of relatively movable sections surrounding the spring, each section provided with means engaging an adjacent section to limit the relative movement therebetween, a lubricant impervious lining completely surrounding the spring disposed within said sections and in intimate contact with the spring leaves, cushioning means disposed between said lining and said sections whereby said impervious lining may be yieldingly supported, and coupling means for a grease gun having a passageway communicating with the interior of the impervious lining whereby lubricant may be forced throughout the interior of said lining and cause a compressing thereof upon said cushioning means.

8. In a spring casing adaptable for the reception of lubricant under pressure, the combination of an inner lubricant impervious lining completely surrounding the spring laminations, an outer metallic casing surrounding the lining with an intervening space between the walls thereof and the lining, cushioning means disposed in said intermediate space extending the length of the spring on four sides thereof, and grease gun coupling means carried by the metallic casing extending inwardly to the interior of said lining, whereby lubricant may be forced throughout the interior of said lining and cause a compressing of said lining upon said cushioning.

9. In a spring casing of the character described, the combination of a plurality of relatively movable sections completely surrounding four sides of the spring, an inner lining comprising an impervious lubricant fabric also surrounding four sides of the spring, there being an intermediate space between the casing and the lining, cushioning means disposed in said space and extending longitudinally of the spring, and grease gun coupling means carried by one of the sections whereby lubricant may be forced within said lining under pressure.

10. In a spring casing of the character described, the combination of an inner lubricant impervious lining, an outer metallic cover and cushioning means completely surrounding the lining and maintained in place by said outer metallic cover.

11. In a spring casing of the character described, the combination of an inner lubricant impervious lining adapted to completely surround the spring of a vehicle, an outer flexible metallic cover and cushioning means interposed between the lining and the cover and extending around the four sides of the lining.

12. In a spring casing of the character described, the combination of a lubricant receiving sack adapted to surround four sides of the spring leaves, a flexible metallic cover surrounding the sack with a space therebetween and cushioning means filling all of said space.

13. A vehicle spring cover of the character described comprising a plurality of articulated units adapted to completely enclose four sides of a vehicle spring, a lubricant impervious lining adapted to completely enclose the vehicle spring and cushioning means extending completely around the lining and disposed between the articulated units and the lining.

14. A vehicle spring cover of the character described, comprising a plurality of articulated units, adapted to completely enclose four sides of a vehicle spring, each of said units having its longitudinal edges in overlapping relation and engaging the transverse edges of adjacent sections around the four sides of the spring.

15. A vehicle spring cover of the character described, comprising a plurality of relatively movable articulated units adapted to be joined around four sides of a vehicle spring, the longitudinal seams of the units being alternately disposed along the top and bottom of the cover and each unit being formed to engage adjacent co-operating units around the four sides thereof.

In testimony whereof, I hereunto affix my signature.

CARL W. SCHAEFER.